(12) United States Patent
van Nuland (10) Patent No.: US 8,294,987 B1
(45) Date of Patent: Oct. 23, 2012

(54) IMAGE TRANSFORMING DEVICE (76) Inventor: Henricus Servatius Fransiscus van Nuland, Mexico City (MX)

( * ) Notice: Subject to any disclaimer, the term of this patent is extended or adjusted under 35 U.S.C. 154(b) by 34 days.

(21) Appl. No.: 13/228,769

(22) Filed: Sep. 9, 2011

(51) Int. Cl.
*G06T 15/00* (2006.01)
(52) U.S. Cl. ........................................ 359/446; 359/463
(58) Field of Classification Search .................. 359/446, 359/463–479; 385/100–121
See application file for complete search history.

(56) References Cited

U.S. PATENT DOCUMENTS

| | | | |
|---|---|---|---|
| 2,576,147 A * | 11/1951 | Sauvage | 40/427 |
| 3,033,731 A | 5/1962 | Cole | |
| 3,043,910 A * | 7/1962 | Hicks, Jr. | 348/804 |
| 3,247,755 A * | 4/1966 | Siegmund | 385/120 |
| 3,520,588 A * | 7/1970 | Salyer et al. | 359/464 |
| 3,741,839 A | 6/1973 | Komiya | |
| 3,853,658 A * | 12/1974 | Ney | 156/180 |
| 3,909,109 A | 9/1975 | Aurenz | |
| 4,101,188 A | 7/1978 | Yevick | |
| 4,571,616 A | 2/1986 | Haisma et al. | |
| 5,009,483 A | 4/1991 | Rockwell, III | |
| 5,216,738 A * | 6/1993 | Feder | 385/114 |
| 5,303,373 A | 4/1994 | Harootian, Jr. | |
| 5,376,201 A | 12/1994 | Kingstone | |
| 5,546,492 A * | 8/1996 | Ansley et al. | 385/116 |
| 5,700,574 A | 12/1997 | Flautt et al. | |
| 5,896,225 A | 4/1999 | Chikagawa | |
| 6,064,424 A | 5/2000 | van Berkel et al. | |
| 6,118,584 A | 9/2000 | Van Berkel et al. | |
| 6,128,132 A | 10/2000 | Wieland et al. | |
| 6,243,520 B1 | 6/2001 | Goldman | |
| 6,549,710 B2 * | 4/2003 | Simmons et al. | 385/121 |
| 6,618,529 B2 | 9/2003 | Lowry | |
| 6,832,037 B2 | 12/2004 | Aylward et al. | |
| 6,892,011 B2 | 5/2005 | Walker et al. | |
| 7,024,082 B2 * | 4/2006 | Kerr et al. | 385/114 |
| 7,027,081 B2 | 4/2006 | Kremen | |
| 7,081,332 B2 | 7/2006 | Chen | |
| 7,142,232 B2 * | 11/2006 | Kremen | 348/51 |
| 7,397,993 B1 | 7/2008 | Nave et al. | |
| 7,738,171 B2 * | 6/2010 | Tsai et al. | 359/463 |
| 7,874,678 B2 | 1/2011 | Hines | |

(Continued)

FOREIGN PATENT DOCUMENTS

CA     2328277 C     9/2009

(Continued)

*Primary Examiner* — Clayton E LaBalle
*Assistant Examiner* — Kevin Butler
(74) *Attorney, Agent, or Firm* — Louis Ventre, Jr.

(57) ABSTRACT

An image transforming device enables 3-D auto-stereoscopic display of a two-dimensional projected image. Optical waveguides in the form of ribbons are used. A stack of ribbons at a receiving end receives the projected image. A horizontal and vertical ribbon arrangement at the other end of the ribbon forms a screen for display of a transformed 3D image. A spacer material at the output end separates the vertical positioning of each ribbon. A screen may be assembled from the output ends of multiple devices forms. The two-dimensional image may be projected in changing colors. When changing colors are projected, the device may further include two lens arrays: a static micro-lens array and a dynamic array of micro-lenses, which is capable of motion synchronized with the changing colors.

7 Claims, 7 Drawing Sheets

U.S. PATENT DOCUMENTS

| | | | |
|---|---|---|---|
| 7,978,407 B1* | 7/2011 | Connor | 359/463 |
| 7,982,924 B2 | 7/2011 | Endo et al. | |
| 2003/0002831 A1* | 1/2003 | Chandraiah et al. | 385/114 |
| 2004/0130503 A1 | 7/2004 | Hamagishi et al. | |
| 2004/0146256 A1* | 7/2004 | Solntsev | 385/116 |
| 2005/0237622 A1* | 10/2005 | Yoshino | 359/618 |
| 2007/0277922 A1* | 12/2007 | Kerr et al. | 156/174 |
| 2008/0144174 A1 | 6/2008 | Lucente et al. | |
| 2008/0204546 A1* | 8/2008 | Dawe et al. | 348/51 |
| 2011/0164036 A1* | 7/2011 | De Zwart et al. | 345/419 |
| 2011/0170183 A1* | 7/2011 | Chang | 359/463 |

FOREIGN PATENT DOCUMENTS

| | | |
|---|---|---|
| WO | WO9810404 A1 | 2/1998 |

* cited by examiner

IMAGE TRANSFORMING DEVICE

TECHNICAL FIELD

In the field of optical systems, an image transforming device for use in an auto-stereoscopic display apparatus is disclosed. The device enables viewer perception with unaided eyes of three-dimensional images transformed from projected two-dimensional images. The device includes a plurality of transmitting elements and may include a lenticular.

BACKGROUND ART

Today's commercial auto-stereoscopic displays typically use a lenticular, also known as a lenticular screen, in front of an LCD (Liquid Crystal Display) flat panel display to create up to nine viewing zones. This low number makes it difficult to find the right position, and stay in the position, to be able to see the stereo image. The number of available pixels and their relative large size make creating more viewing zones result in an undesirable low resolution three-dimensional (3D) image. Commercial available displays come in standard formats such as the HDTV (High Definition Television) format having 1920×1080 pixels and creating an 3D image with 24 views would result in a 3D image with 1920/24=80 pixels× 1080 pixels. It would be desirable to have a display with 1920×4=7680 pixels×1080/4=270 pixels. Such a display with a lenticular attached to it would have 24 pixels behind each lens and create a 320×270 pixel 3D image with 24 viewing zones.

One known solution uses an array of image projectors that project onto one lenticular screen, which creates many more viewing zones, and therefore makes it much easier for people to find the right position to receive a stereo image and at a much-higher 3D resolution. Using an array of projectors with a projection screen at some distance is no longer a compact system and could be better defined as being an installation. Such an installation is difficult to setup and there are many details such as optical distortions to take care of in order to obtain a good-quality 3D image.

The use of a lenticular screen to create the viewing zones has become very popular but its large thermal coefficient of expansion compared to the image generating device makes the quality of the 3D image depend on the temperature. And this is more noticeable when create many viewing zones and a large auto-stereoscopic display.

Others have proposed using rigid small optical fiber tapers to join the images from an array of micro displays together to form one compact large display. These optical fiber tapers can be seen as compact optical projection devices free of optical distortions. The array of fiber tapers create one large high-resolution screen where the resolution is equal in all directions which is perfect to create so called full parallax auto-stereoscopic displays but an over kill when used in the more common horizontal parallax only auto-stereoscopic displays. These optical fiber tapers are rigid, difficult to produce in larger sizes (maximum 20 centimeters), have a limited, 1:6, ratio between input and output surface and are not flexible limiting its use to create large displays cost effectively.

Images from nine projectors using nine flexible optical fiber bundles have been used. These flexible bundles make it easy to join many projectors. The objective of nearly all optical light guiding bundles is to transmit an image undistorted from one side to the other side. This is easily done by winding a fiber onto a drum. The circular shaped bundle is then cut ones to create the input side and the output side. The configuration of the fiber on the input side and output side are then perfectly equal and can transmit an image without distortion. Joining the output ends of these nine bundles creates one small image surface with the same height as the bundles, only nine times wider.

Much larger output surfaces have been created manually with optical fibers. This is done by using relatively thick optical fibers resulting in a not-always-compact end-screen with an enlarged image less suitable to create auto-stereoscopic displays.

SUMMARY OF INVENTION

This is an image transforming device enabling auto-stereoscopic display of a two-dimensional projected image. The device includes optical waveguides assembled into ribbons. Each ribbon has a height at least equal to the height of a row of pixels in the projected image. The number of optical waveguides in each ribbon is at least equal to the number of pixels in the row of pixels.

Each ribbon receives at a receiving end at least one row of pixels from the projected image. At the other end of the ribbon is the output end for emitting the pixels received at the receiving end.

At their receiving end, the ribbons are organized into a compact stack, where all the ribbons in the stack receive at least the entire height of the projected image.

At their output end, the ribbons are laid out in a specific pattern to form a screen. A first quantity of ribbons, for example 5 ribbons, is fixed into position horizontally adjacent to each other to form a first output row of pixels and the remaining ribbons are stacked on top of that first row with a spacer material between each of the output rows.

The optical waveguides within any one ribbon may have an ordered structure or have a random vertical alignment, but have the same relative position at either end.

The spacer material and the output end of each ribbon may have a shape conforming to a lenticular such that there is an equal distance between the lenticular and all portions of the screen. The lenticular and the screen may have a planar, cylindrical concave or cylindrical convex shape.

A screen may be assembled from the output ends of multiple devices forms.

The two-dimensional image may be projected in changing colors. When changing colors are projected, the device may further include two lens arrays: A static micro-lens array located between the stack and the two-dimensional image to reduce the size of each pixel received at the receiving end of each ribbon; and a dynamic micro-lens array, which is capable of motion synchronized with the changing colors. The dynamic micro-lens array is positioned between the stack and the static micro-lens array in order to displace pixels to different position on the receiving end than would otherwise be the case in the absence of such displacement.

Technical Problem

Existing attempts at auto auto-stereoscopic display using fibers have produced very poor-quality 3D images. In all such attempts, the concept is image in equals image out. Image transformation has not been done.

Ribbons made with optical fibers are used in other fields and typically have less than 100 fibers. As a result, such ribbons are not suitable for imaging applications because there are not enough fibers to convey all the pixels. In these ribbons, the fibers are perfectly ordered and this would be very difficult to accomplish when using thousands of fibers needed for the present invention.

Such ribbons are also made with large fibers, which results in a low-resolution screen. With the prior art, fiber terminations would become the pixels of the screen. These pixels are round, which tend to cause dead space between them and which is less suitable for 3D. The prior art is not practical because at best it can capture one image pixel per fiber, and is too difficult to make because it requires a very high precision in order to display high-definition 3D images. Others have tried to increase the number of viewing zones to create 3D images by moving a lenticular in front of a screen, but this has proved impractical because of size and weight.

3D displays need a display screen with many thousands precisely closely packed horizontal pixels and just a few hundred vertically, spaced adequately to have square 3D pixels.

While optical fibers can be used, such use is not economical. Optical fiber can be produced in a drawing tower at a rate of 2 km/min. However, there are only so many drawing towers in the world and all are occupied to produce the very costly $9/km telecommunications fibers. Using more economical borosilicate fiber is not the answer because it would make one device cost about $1000. Then, there is still the cost of winding, cutting, gluing and stacking. Extrusion and embossing may be future options, but these still need to be improved.

Experimentation has shown that current technology employing shifting the viewing zones of an auto-stereoscopic display by moving a large lenticular in front of its screen is not a practical option for enhanced resolution. The lenticular and frame weigh about 1 kilogram, which must be moved over a 1 to 2 millimeters distance, which is very difficult to achieve and is very noisy.

Solution to the Problem

The solution is an image transforming device employing a thin ribbon with thousands of small optical waveguides instead of multi-fibers with tens of fibers. A good solution is glassfibers in no organized geometric order and of sufficient number to capture one pixel over many fibers. Embossing or etching transparent plastic ribbons is another good method to create ribbons with many thousands of optical waveguides.

The solution uses the vertical resolution of the standard image to increase the horizontal resolution. The solution using ribbons and spacers enables a screen that is as flat as possible, at relatively low cost, and that can be produced in large quantities at good quality.

Using a static micro-lens array coupled with a dynamic micro-lens array solves the problem of moving a large lenticular for increased resolution because the weight of the dynamic micro-lens array is many times less, about 10 grams, and only needs to move over a small, 0.05 millimeter, distance making increasing the horizontal resolution of the screen practical as well as quiet.

Advantageous Effects of Invention

The image transforming device is a compact apparatus that rearranges pixels received from a projected two-dimensional image to deliver an output image that has high resolution in a different format than the resolution of the input image.

The image transforming device is amenable to manufacturing in large series at a very low cost, preferably less than about $100 so as to enable it to be used in commercially viable auto-stereoscopic displays.

The image transforming device produces an image at a light emitting screen with full color pixels where there are more pixels horizontal than vertical as compared with the original two-dimensional image. And in that way, a 3D image can be created in a much more suitable format/resolution. This is accomplished using ribbons of optical waveguides having a defined placement so as to create an auto-stereoscopic image with many viewing zones. The image transforming device is preferably used for auto-stereoscopic displays or 3D imaging and an array of such devices can form a bigger screen. The image transforming device can be made so that the screen can be curved to create cylindrical displays.

Glassfibers preferably used as optical waveguides in ribbon form are very cheap basic material. For one device the fiber would cost $20. Then, that fiber would be processed by a winding, cutting, stacking robot, preferably in a manufacturing operation at 24 hours per day, 7 days a week, which would yield a final cost of manufacturing will be about $35.

Embossing/etching plastic ribbons would be even more economical because the material cost will be less than $20 and the winding process is not necessary. Using a roll of ribbons enables simply cutting the correct length and stacking, which makes the manufacturing cost about $25 and increases the production speed by a factor.

The proposed solution is significantly better than current technology because there is no need to create a perfect grid of fibers on the receiving end; and that makes it possible to have a high-speed manufacturing. So commercially attractive products can be made using glassfiber, or embossed transparent plastic, as optical waveguides. Using a dynamic micro-lens array makes it possible to use a lower resolution image and still be able to get all the views needed for high-resolution 3D images. Using a lower resolution image and the associated electronics would be less expensive. Alternatively, using the dynamic micro-lens array with a high resolution image would increase the number of viewing zones and the 3D image quality by a factor, which is not realistically obtainable when using one pixel per fiber image guiding devices.

BRIEF DESCRIPTION OF DRAWINGS

The drawings illustrate preferred embodiments of the method of the invention and the reference numbers in the drawings are used consistently throughout. New reference numbers in FIG. 2 are given the 200 series numbers. Similarly, new reference numbers in each succeeding drawing are given a corresponding series number beginning with the figure number. The drawings are not to scale, as is evident because the optical waveguides would be invisible.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

Figure 1:
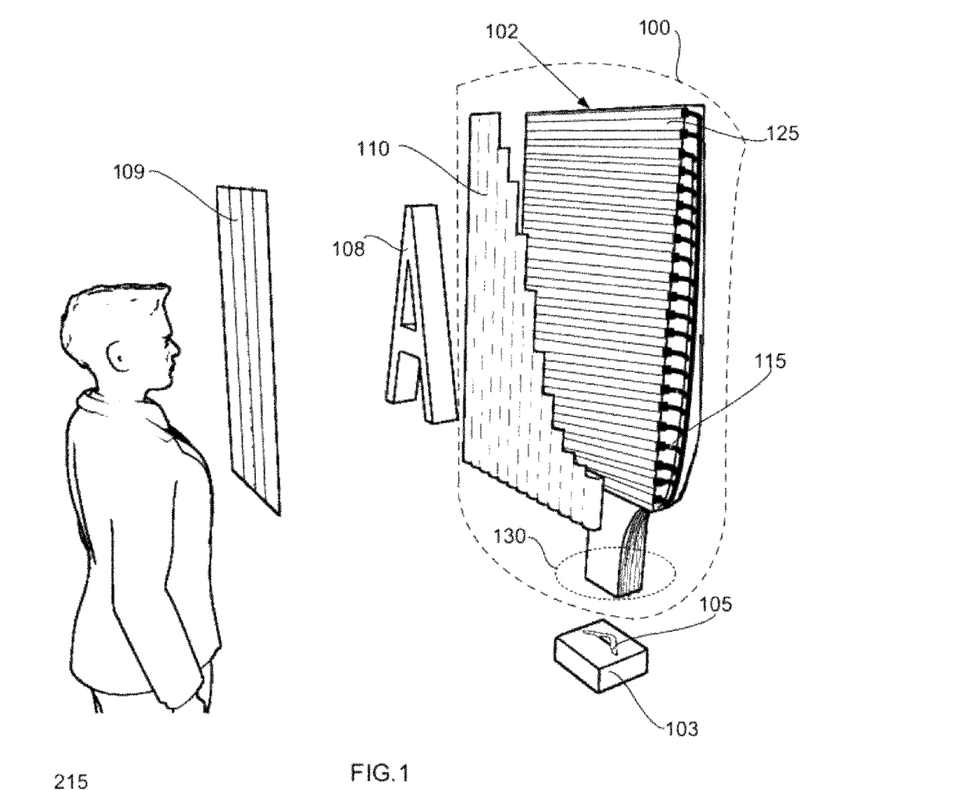
FIG. 1 is a perspective view of an image transforming device showing a 3-D image.

FIG. 1 illustrates an image transforming device (100) used for auto-stereoscopic display of a two-dimensional image (105). The image transforming device (100) includes a plurality of optical waveguides (405) assembled into ribbons. Each ribbon (115) has a receiving end (305) for receiving a portion of pixels (415) projected into the image transforming device (100) and an output end (310) for emitting the pixels (415) received at the receiving end (305). The ribbons are organized into a stack (130) at their receiving ends. The stack (130) is a quantity of ribbons at least equal to the number of pixels (415) in one of the columns of pixels (215). The ribbons connected at their output end (310) to form a screen (102). The image transforming device (100) further includes a spacer material (125) between each output row of pixels separating each ribbon (115) from another ribbon (115) in the screen (102).

In using the image transforming device (100), a projector (103) projects the two-dimensional image (105) into the image transforming device (100). Thus, the projector (103) is a device that projects a two-dimensional image (105).

Figure 2:
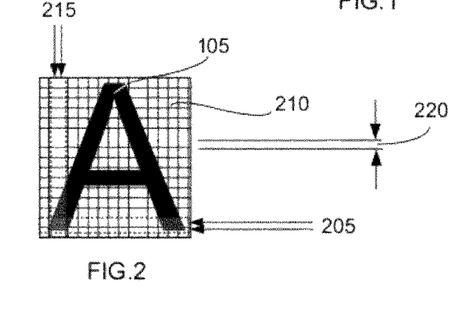
FIG. 2 is a top view of a grid of a two-dimensional image.

The two-dimensional image (105) is made up of pixels (415) arranged in a grid (210). A pixel is an image element of an image generated by the projector (103). The grid is composed of rows of pixels (205) having a uniform height and columns of pixels (215). Each of the pixels (415) in the two-dimensional image (105) typically has a uniform width, height or diameter, as illustrated in FIG. 2.

Figure 3:
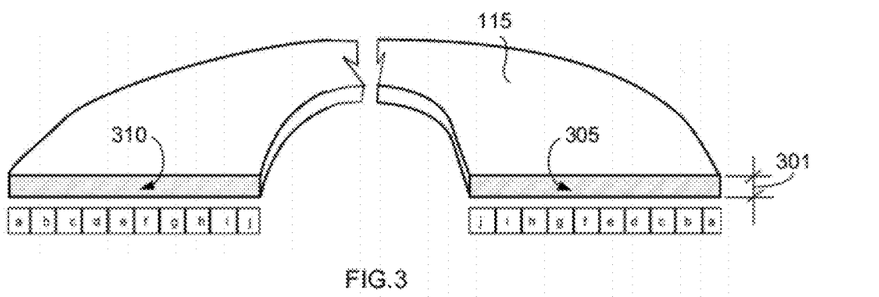
FIG. 3 is a perspective view of the ordered ends of a ribbon.

The image transforming device (100) includes a plurality of optical waveguides (405) assembled into a ribbon (115) and there are a plurality of such ribbons. FIG. 3 illustrates a ribbon (115). Each ribbon (115) holds at least a number of optical waveguides (405) equal to the number of pixels (415) in one of the rows of pixels (205) in the grid (210), preferably at least about two times the number of pixels (415) in one of the rows of pixels (205) in the grid (210). Each ribbon (115) has a thickness (301) that in many cases is in the order of 0.05 millimeters (mm) but can be thicker or thinner and correlates to the height of the pixels of the received image. The width of the ribbon is equal to the width of the received image. The length of the ribbon depends on the height of the screen and normally is less than 100 cm.

Each ribbon (115) is structured with a receiving end (305) for receiving a portion of the pixels (415) equaling at least one of the rows of pixels (205) in the grid (210). Each ribbon (115) has a height at least equal to the height of a row of pixels (220) in the grid (210). In respect to the drawings, the optical waveguide's are in reality so small, in many cases smaller than 0.05 mm, that drawing them in proportion to the other elements would make them invisible. For many preferred embodiments, a ribbon (115) will contain about 1,000 optical waveguides.

There are at least two types of optical waveguide ribbons: TYPE-A, discrete, referring to a ribbon made up of an equal number of optical waveguides channels as there are pixels in one row of the receiving image; and TYPE-B, continuous, referring to a ribbon made up out of many times more smaller optical waveguides channels than there are pixels in one row of the receiving image.

Figure 3A:
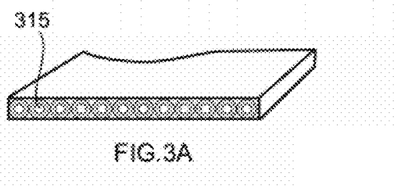
FIG. 3A is a perspective view of a ribbon with optical waveguides in the form of small-core fibers arranged in a circular-thick-wall-single-row.
Figure 3B:
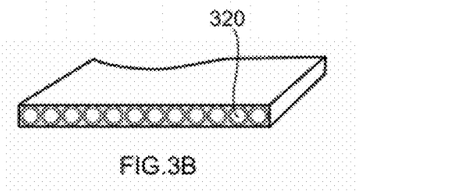
FIG. 3B is a perspective view of a ribbon with optical waveguides in the form of large-core fibers arranged in a circular-thin-wall-single-row.
Figure 3C:
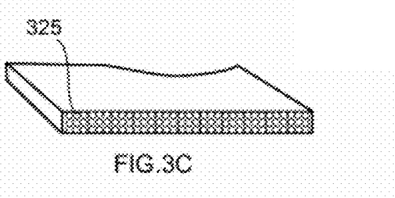
FIG. 3C is a perspective view of a ribbon with optical waveguides in the form of multi-fibers arranged in ordered-multiple-rows.
Figure 3D:
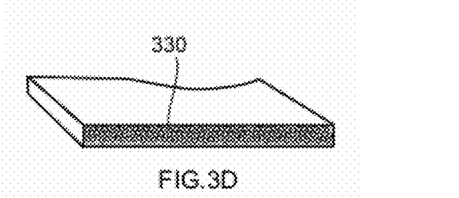
FIG. 3D is a perspective view of a ribbon with optical waveguides in the form of glassfibers arranged in a random-multiple-row.
Figure 3E:
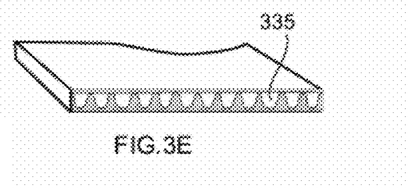
FIG. 3E is a perspective view of a ribbon with optical waveguides that are embossed in an oval-spaced-thick-walled-single-row.
Figure 3F:
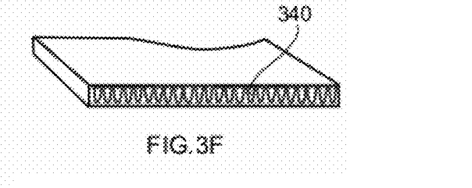
FIG. 3F is a perspective view of a ribbon with optical waveguides that are arranged in an oval-thin-walled-single-row.
Figure 3G:
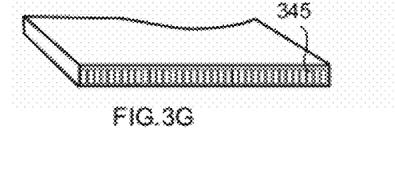
FIG. 3G is a perspective view of a ribbon with optical waveguides that are etched and arranged in a rectangular-thin-walled-row.

TYPE-A ribbons, are illustrated in FIG. 3A, FIG. 3B and FIG. 3E. Type-A ribbons are created by a plurality of longitudinally extending optical waveguide channels disposed in a side-by-side array with the longitudinal axes thereof being substantially parallel to one another. Both ribbons will work in the image transforming device (100).

TYPE-B ribbons are illustrated in FIG. 3C, FIG. 3D, FIG. 3F and FIG. 3G. TYPE-B ribbons are a preferred ribbon type for the image transforming device (100) because this type will deliver better resolution with the use of a dynamic micro-lens array (1110) and will lessen the complexity and cost of manufacturing ribbons. The term "resolution" refers to a plurality of pixels in either the horizontal or vertical direction of the two-dimensional image (105).

The manufacture of both types of ribbons may be accomplished using drawing optical fibers and winding them onto a drum. Other known methods include using photo lithography, printing, laser emblazing, etching, embossing, and extrusion.

FIG. 3 illustrates the relative ordering of optical waveguides (405) in a ribbon (115) such that each optical waveguide maintains the same relative position at the receiving end (305) as at the output end (310). This is indicated by the alphabetical listing representing were the optical waveguides start at the receiving end and wind up at the output end (310). Essentially, the concept is that the order of pixels, abcdefghij, entering the ribbon is the same order leaving the ribbon, abcdefghij.

FIGS. 3A-3G illustrate the variety in placement of optical waveguides (405) within any one ribbon (115). These include: small core fibers (315) arranged in a circular-thick-wall-single-row; large-core fibers (320) arranged in a circular-thin-wall-single-row; multi-fibers (325) arranged in ordered-multiple-rows; glassfibers (330) arranged in a random-multiple-row; oval-spaced-thick-walled-single-row (335); oval-thin-walled-single-row (340); and etched and arranged in a rectangular-thin-walled-row (345).

TYPE-A ribbons transform the received closely packed square image pixels to separated different shaped emitting optical waveguide terminations. For example, optical waveguides with optical waveguides having small core fibers (315) arranged in a circular-thick-wall-single-row, large-core fibers (320) arranged in a circular-thin-wall-single-row, and oval-spaced-thick-walled-single-row (335) arranged in a circular-thin-wall-single-row will emit pixels to the screen that are circular-shaped when optical fibers are used. Using these types of ribbons will in most cases result in horizontally spaced pixels on the screen (102) with dead space between them, which is not desirable for auto-stereoscopic displays.

A plurality of ribbons, M, is stacked and fixed together at their receiving ends in such a way that each ribbon (115) receives a number, N, of pixels (415) from the projected two-dimensional image (105). Thus, the two-dimensional image (105) consists of N×M pixels, where N is a horizontal resolution and M is a vertical resolution. With today's projected image resolutions, it is common that N=1920 and M=1080.

This plurality of ribbons is organized into a stack (130) at their receiving ends. The stack (130) includes a quantity of ribbons at least equal to the number of pixels in one of the columns of pixels (215). This quantity is the same as M, defined above. The ribbons in the stack (130) are preferably closely packed together roughly atop one another with a minimum of space between them. Because the ribbons are flexible they can be bend, twisted and positioned in a variety of possible manners to form the stack (130) of ribbons at the receiving end (305) of the image transforming device (100). As shown in FIG. 8, the receiving end (305) from FIG. 7, can be reshaped using heat and pressure to form a taper (805) to aid in coupling the projected image into the receiving end.

A significant separation between the individual optical waveguides (405) inside a ribbon (115) makes it necessary to add a static micro-lens array before the receiving end (305) to improve the light coupling efficiency. A static micro-lens array is preferably an array of N×M small lenses having the same size as the pixels of the projected two-dimensional image (105).

Figure 4:
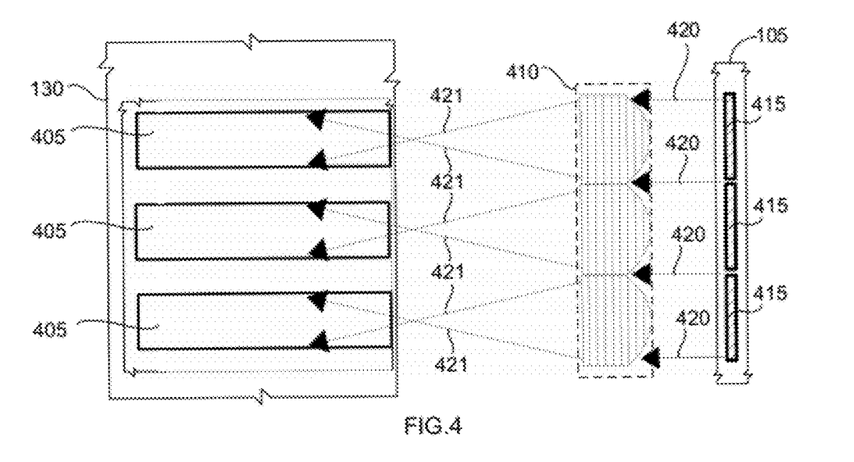
FIG. 4 is a top view light from pixels of an image being focused with a static micro-lens array into optical waveguides.

As shown in FIG. 4, a static micro-lens array (410) may be located between the stack (130) and the two-dimensional image (105). This static micro-lens array (410) receives light, represented by parallel arrows (420), comprised of a pixel and reduces the size of the pixel (415) received at the receiving end (305) from FIG. 7 of each ribbon (115). Each of the pixels (415) is formed into a reduced pixel by converging light, represented by converging arrows (421), that is directed into smaller optical waveguides (405).

Each of the optical waveguides (405) in each TYPE-A ribbon is intended to receive exactly one pixel from the projected image. The precision of the location of each waveguide channel within the ribbon needs to be very high in order to match each pixel with each waveguide channel. Generally speaking there will be more than 1,000 optical waveguides (405) next to each other. Any, even small, difference between the size of the receiving end and the size of the projected image will cause a Moiré effect. Stacking many ribbons on top of each other at the receiving end of the device needs to result in a perfect array of fiber terminations and that will be a great challenge especially when producing the device in large quantities.

A TYPE-B ribbon does not transform the received closely packed square image pixels and will output nearly the same image received. Each of the optical waveguides (405) in each TYPE-B ribbon is intended to receive a small portion of a pixel from the projected image. TYPE-B ribbons are illustrated in FIG. 3C, FIG. 3D, FIG. 3F and FIG. 3G and include multi-fibers (325) arranged in ordered-multiple-rows, glassfibers (330) arranged in a random-multiple-row; oval-thin-walled-single-row (340), etched and arranged in a rectangular-thin-walled-row (345). These TYPE-B ribbons do not have the TYPE-A ribbon problems because the many more smaller optical waveguides (405) in the TYPE-B ribbons receive one pixel of the image.

Known methods produce so called multi-fibers containing an array of K×L fibers. These multi-fibers are produced by drawing not one but an array of K×L fibers, each having a diameter of about 0.01 mm, together from a set of K×L preforms where K=L in most cases and L<7. Placing these multi-fibers adjacent to each other forms an ordered-multiple-row (350) ribbon with a much higher resolution then using single fibers with a larger diameter, such as the spaced-thin-walled-single-row (340) ribbon. For example a 5×5 multi-fiber, would make each received pixel, 0.05 mm square, be captured by 5×5=25 spaced-thin-walled-single-row (340). The vertically placed fibers within the ribbon form a rectangular-single-row (335) because each ribbon is a one-dimensional array of optical waveguides.

Ribbons having multi-fibers (325) arranged in ordered-multiple-rows are also preferable because the optical waveguides are vertically and horizontally aligned with each other. For all of the potential optical waveguide placements, each optical waveguide is positioned within said ribbon (115) so that each optical waveguide's horizontal position is at the same relative position measured from an edge of the ribbon (115) at both the receiving end (305) and the output end (310) of said ribbon (115).

A method of creating a TYPE-B ribbon is by using glassfiber. Glassfibers are produced in parallel, more the 1,000 simultaneously is common, but the method lacks precise fiber diameter and position. Glassfibers are optical waveguides with no surrounding material that improve the light transmission efficiency. Glassfiber and optical fibers are always coated with a so called sizing material to improve their handling and integrity. A suitable sizing material could be used to coat the glassfiber and so improve the light transmission efficiency and prevent light leaking from one fiber to another. Different methods of grouping glassfibers and winding them on a drum, with less precision, result in ribbons consisting of many smaller, for example 0.005 mm, glassfibers. Uniformity in the diameter of each glassfiber is not required. So each glass fiber may be made with a different diameter, which eases manufacturing requirements. An example is glassfibers (330) arranged in a random-multiple-row, which shows optical waveguides in a non-geometric order. A row of image pixels received by a ribbon having glassfibers (330) arranged in a random-multiple-row will be guided to the output end (310) and emit nearly the same row of pixels it received. Using, for example, 10×10, on average, 0.005 mm glassfibers would make one 0.05 mm square pixel be captured by, on average, 100 fibers (10 glassfibers×0.005 mm/glassfiber=0.05 mm).

A method of creating a TYPE-B ribbon involves using embossing or etching optical transparent plastic ribbons. There are many different variations on creating optical waveguides in PMMA (Poly(methyl methacrylate), PLEXI-GLASS. PMMA can be easily produced with different optical properties. Coating a plastic ribbon, that works as cladding, with so called core material and then etching or embossing the desired waveguide shape into the core material. In a second step a new layer of cladding material is coated on top of the core material. In this way, the shaped core material is surrounded by cladding material, to keep the light inside the optical waveguide. Different shapes, core and cladding sizes are possible with this method. The ribbon can then also be made up out of several thinner layers, where in each layers there are many waveguides. Individual waveguides using these methods can be ordered or random. In the production process, they may be produced with a random diameter. Using this method creates not one optical waveguide but many at the same time. And therefore a variety of options and materials are possible. Several ribbons can then also be produced in one step.

Each ribbon (115) is further structured with an output end (310) for emitting the portion of the pixels (415) received at the receiving end (305). While the ribbons (115) at the receiving end (305) are tightly stacked together, the ribbons (115) at the output end (310), the ribbons have a different organization. At the output end (310), a first quantity of ribbons, S, is fixed adjacent to each other atop a spacer material (125) in such a manner as to form together one row of pixels. The terms "spacer material" and "spacer" refer to a solid material to create a separation between ribbons. The thickness of the spacer material (125) increases the vertical height of the screen (102).

Figure 5:
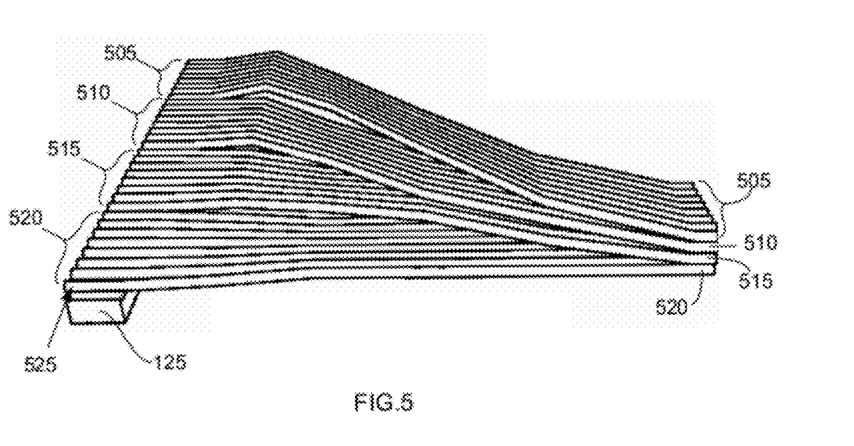
FIG. 5 is a perspective view of four row of ribbons stacked at the receiving end and placed adjacent to each other at the output end.

This is illustrated in FIG. 5, which shows the screen (102) is formed by fixing the first quantity of ribbons into position on a spacer material (125) and adjacent to each other to form a first output row of pixels (525). The first quantity of ribbons is illustrated by first ribbon (505), second ribbon (510), third ribbon (515), and fourth ribbon (520).

Figure 6:
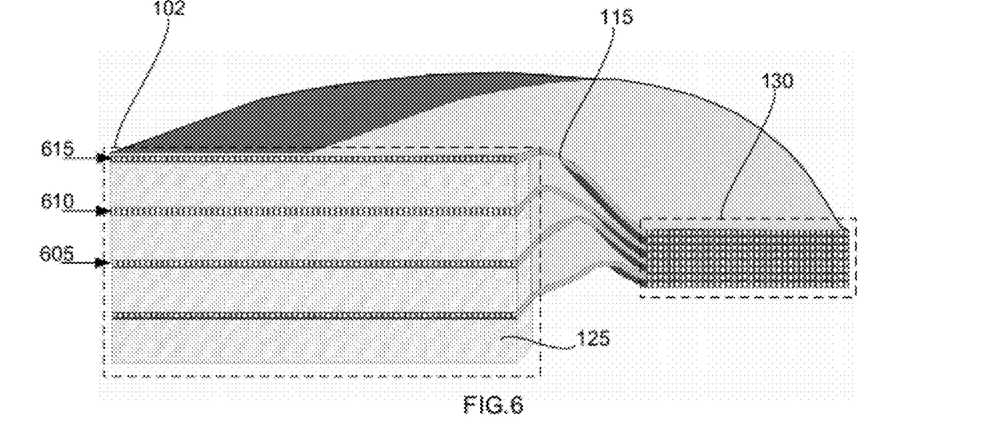
FIG. 6 is a perspective view of a stack of ribbons at their receiving end and the horizontal and vertical placement of ribbons with spacer material at their output end.

As shown in FIG. 6, the remaining ribbons form additional output rows of pixels fixed similarly as the first output row of pixels (525), separated by a spacer material (125), and aligned above the first quantity of ribbons. The additional output rows of pixels illustrated in FIG. 6 are: a first-additional-output-row-of-pixels (605); a second-additional-output-row-of-pixels (610); and a third-additional-output-row-of-pixels (615).

Thus, a plurality of ribbons is connected at the output end (310) to form a screen (102). The term "screen" refers to the surface created by spacer material (125) and output sides of the ribbons.

FIG. 6 illustrates a screen (102) formed by spacer material (125) between each ribbon (115) organized together and in a vertically aligned fashion. The spacer material (125) is between each output row of pixels separating each ribbon (115) from another ribbon (115) in the screen (102).

Figure 7:
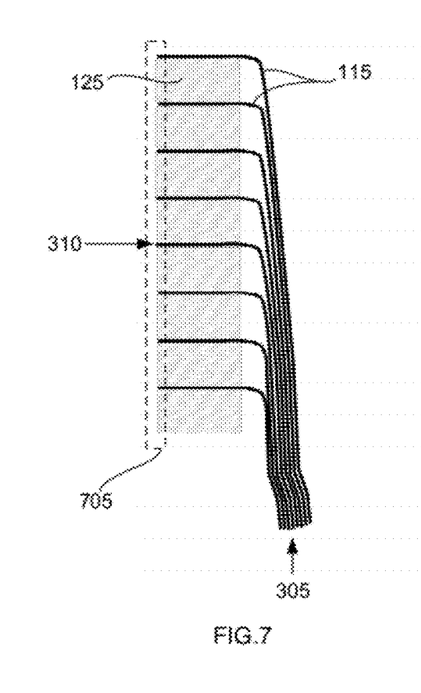
FIG. 7 is a side elevation view of a stack of ribbons at their receiving end and the vertical placement of ribbons with spacer material at their output end.
Figure 8:
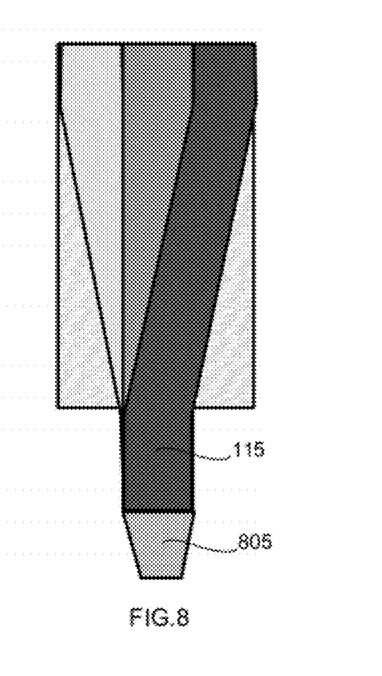
FIG. 8 is a top view of a stack of ribbons showing receiving end shaped to form a taper.

FIG. 7 illustrates a side view of the image transforming device (100) and how each ribbon (115), fixed to the spacer material (125), is flexibly routed to form a flat screen (705) seen from the side and represented by the dashed enclosure.

Example 1

The principles of an operational image transforming device (100) involve receiving a projected two-dimensional image (105) made up of N×M pixels into M optical waveguides (405) within the receiving end (305) of each ribbon (115) in the stack (130) of ribbons. The received projected two-dimensional image (105) is then transformed to (N×S)×(M/S) pixels on the screen (102) where S is a number greater than one. For example, with S=4, which indicates four ribbons are placed adjacent to each other at their output end (310). If the projected two-dimensional image (105) has an array of 1920×1080 pixels, then the screen (102) emits an array of 1920×4=7680 pixels horizontally by 270 pixels vertically. This in contrast with current available optical fiber arrays like tapers and array-type light guiding bundles, which don't change the resolution.

The image transforming device (100) may include a lenticular (910) placed adjacent to the screen (102). Creating an auto-stereoscopic image with the image transforming device (100) may be achieved by ensuring that the lenticular (910) is placed in position between the screen and the viewer so that it alters the pixels (415) viewed by the viewer. The width of the lenticular lenses creates the width of the horizontal 3D pixel. It is common for an image to have square pixels and therefore the height of the spacer less the thickness of the ribbon should be equal to the width of the lenticular lenses. This height of the spacer material creates space behind the screen to bend the ribbons and so create a compact flat device. Without this space it will become very difficult to bend the ribbons in such a compact manner.

The shape of the lenticular (910) preferably determines the corresponding shape of the spacer material (125) and the output end (310) of each ribbon (115). The spacer material (125) and the output end (310) of each ribbon (115) preferably have a shape conforming to the lenticular (910) such that there is an equal distance between the lenticular and all portions of the screen (102). The lenticular (910) and the screen (102) may typically have geometric forms described as planar, cylindrical concave and cylindrical convex. This is illustrated in FIG. 10 showing: a planar output end (1005a) of a ribbon (115), which produces a planar screen (1010a); a cylindrical concave output end (1005b), which produces a cylindrical concave screen (1010b) that will surround the observer to create a kind of Virtual Reality environment; and a cylindrical convex output end (1005c), which produces a cylindrical convex screen (1010c) that tends to place the auto-stereoscopic image inside the cylindrical convex screen (1010c).

A lenticular is known to change its dimensions with changes in the ambient temperature. The typical material for a lenticular is transparent acrylic or PET (polyethylene terephthalate). Depending on its fabrication process, a lenticular will have a thermal expansion coefficient of 43 PPM (parts per million) up to 134 PPM which is much more than that of glass, which is less the 10 PPM. A twenty-degree temperature increase causes a 100 cm long lenticular to expand 1.2 mm which is close to the diameter of a micro-lens of the lenticular and results a noticeable change in viewing experience and 3D quality of the intended auto-stereoscopic display. The spacer material (125) should, therefore, be preferably made out of a material that closely matches the thermal coefficient of the lenticular material to avoid such problems. Mismatched expansion is more of a problem for current technology because the screen is made of glass. Mismatched expansion for the image transforming device (100) is avoided because the screen is preferably made of plastic.

Figure 10A:
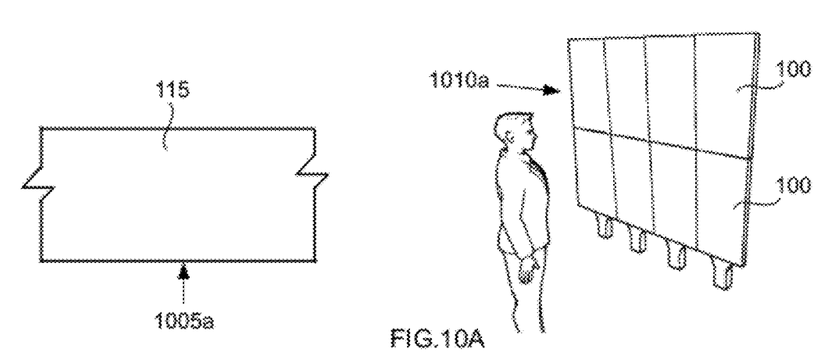
FIG. 10a is a top view showing a ribbon with a planar output end to create a planar screen with multiple image transforming devices.
Figure 10B:
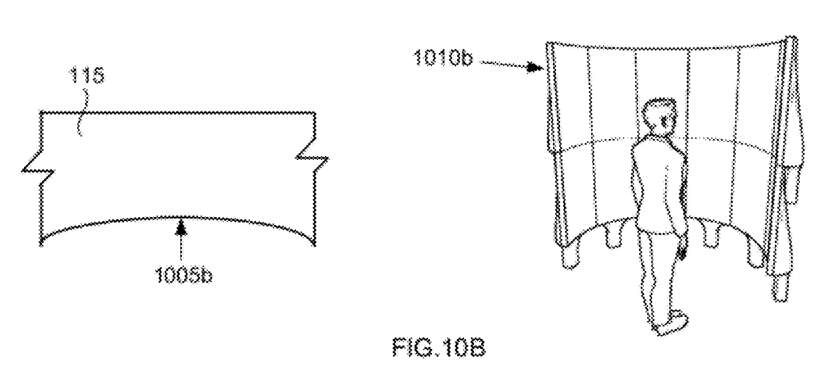
FIG. 10b is a top view showing a ribbon with a cylindrical concave output end to create a cylindrical concave screen with multiple image transforming devices.
Figure 10C:
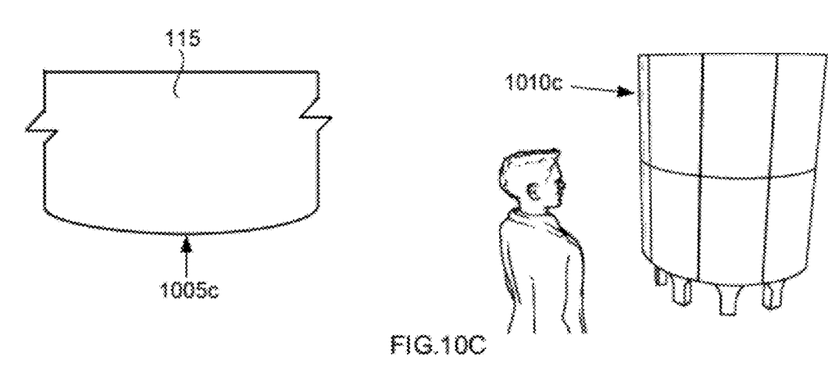
FIG. 10c is a top view showing a ribbon with a cylindrical convex output end to create a cylindrical convex screen with multiple image transforming devices.

Each of the three screens shown in FIG. 10 is a combination screen for viewing an image in that each is an assembly of screens formed by a plurality of the image transforming devices. This assembly is indicated by the rectangular segments in each figure.

Example 2

Figure 9:
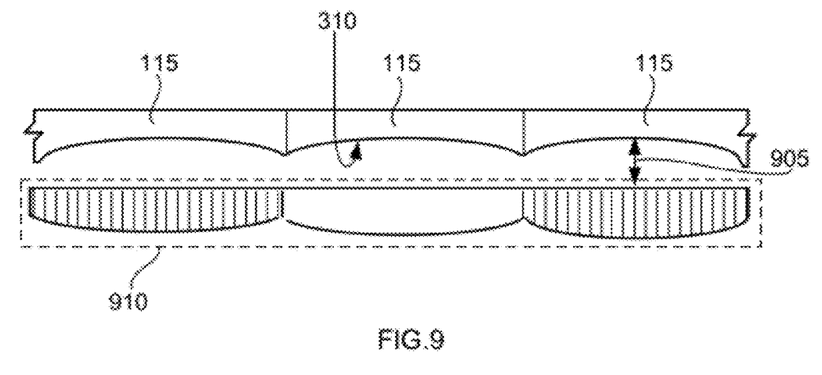
FIG. 9 is a top view of a shaped output end of a ribbon and a lenticular, illustrating a variable distance between the output end and the lenticular.

FIG. 9 illustrates how the end of each ribbon (115) is cut into a shape to improve the 3D image quality. Because each ribbon (115) is very thin, on the order of 0.05 mm, they can be cut with for example a 10 Watt carbon-dioxide laser using a lens with a 10 mm focal length that focuses the beam into a spot of 0.034 mm with a 0.2 mm focus depth. Cutting ribbons in this manner is not only fast and precise but also create a clean ribbon cross section. Adjusting the distance (905) between the emitting pixels and the lenticular (910) in this way can improve the viewing experience for an auto-stereoscopic display by reducing ghost images for example. The end face of the ribbon does not need to be cut perpendicular to the length of the ribbon, but may be cut at an angle such as the Brewster angle to improve the light coupling efficiency.

When the projected two-dimensional image (105) is projected in changing colors, the image transforming device (100) may take advantage of these colors to provide additional resolution of the 3D image with added components of the static micro-lens array (410) coupled with a dynamic micro-lens array (1110). These components are added to operate on the pixels (415) to be received by the stack (130).

Figure 11A:
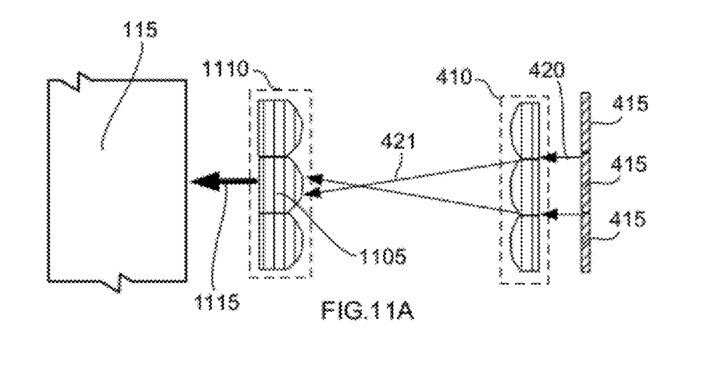
FIG. 11a is a side elevation view illustrating light from an image pixel moving through a dynamic micro-lens array in a first position.
Figure 11B:
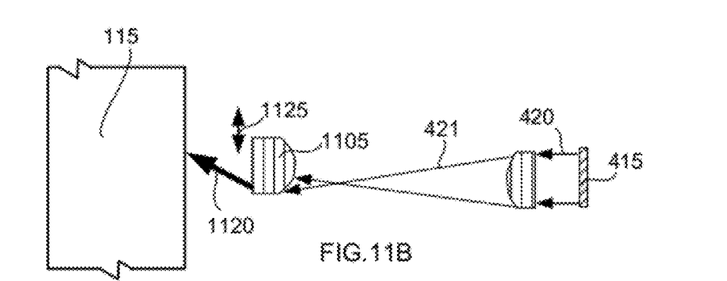
FIG. 11b is a side elevation view illustrating light from an image pixel moving through the dynamic micro-lens from the array of FIG. 11a having moved to a second position.

FIG. 11A and FIG. 11b illustrate the combination of a static micro-lens array (410) and a dynamic micro-lens array (1110). Each micro-lens (1105) in the dynamic micro-lens array (1110) is capable of vibrational motion synchronized with the changing colors of the two-dimensional image (105). The entire dynamic micro-lens array (1110) preferably moves as a unit, but it may be possible to computerize vibrational motion of segments of the array or of each individual micro-lens.

The micro-lenses of the static micro-lens array (410) and the dynamic micro-lens array (1110) may be shaped spherically or as micro cylindrical lenses forming a micro lenticular, or in other shapes that may be desired. Using two micro lenticulars would transform incoming square pixels into rectangular shaped pixels. FIG. 11a shows the converging light represented by converging arrows (421) when the dynamic micro-lens array (1110) is in a first position. A first direction of light (1115) emerges from the dynamic micro-lens array (1110) and proceeds into the ribbon (115).

FIG. 11b shows one of the lenses in the dynamic micro-lens array (1110) at a second position after movement from the synchronized vibrational motion, which is indicated by the new position on the micro-lens (1105) of the converging light represented by converging arrows (421). The synchronized vibrational motion is indicated by the double-headed arrow (1125). A second direction of light (1120) emerges from the micro-lens (1105) and it enters the ribbon (115) at a different location. Thus, the dynamic micro-lens array (1110) is positioned between the stack and the static micro-lens array and the motion of the micro-lens causes the displacement of each reduced pixel to different position on the receiving end (305) than would otherwise be the case in the absence of such displacement.

Using a static micro-lens array (410) coupled with a dynamic micro-lens array (1110) does not require that one pixel fit one micro lens of either array. For example, two pixels may be captured by each micro-lens, which would then mean that those two pixels would be relocated. The dynamic micro-lens array (1110) may also move vertically to translate the image pixels up or down in order to increase the vertical resolution of the device. The refresh rate is the number of images per second of the projected image. Depending on the refresh rate, the dynamic micro-lens array (1110) makes it possible to increase the horizontal and/or vertical resolution of the screen (102) by a factor in a time sequential manner.

Figure 12:
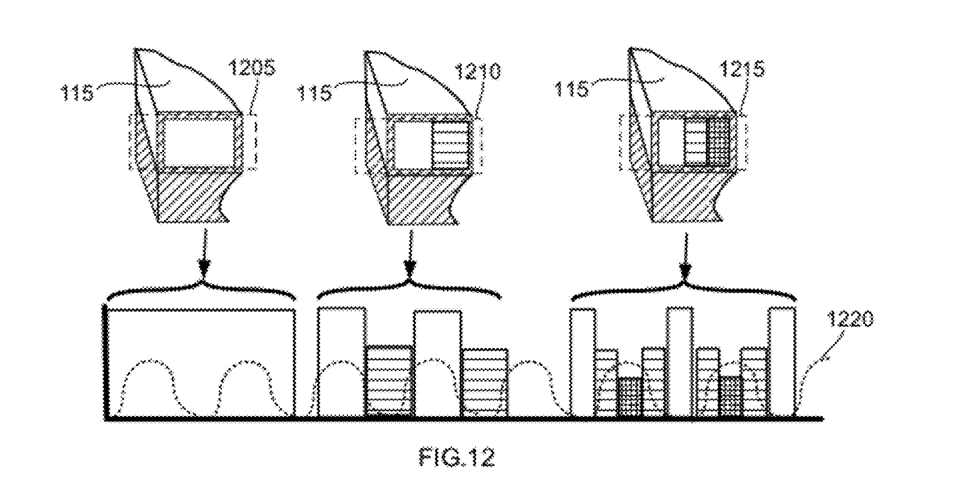
FIG. 12 illustrates how three pixel data configurations are translated by the movement of a dynamic micro-lens array.

FIG. 12 Illustrates pixel movement using TYPE-B ribbons in an image transforming device (100) having a dynamic micro-lens array (1110). The dynamic micro-lens array (1110) vibrates (1220) over a distance more or less equal to the width of a micro-lens in the dynamic micro-lens array (1110). In terms of movement, the two-dimensional image (105) is the master and the dynamic micro-lens array (1110) is the slave closely following such alternating pixel transitions. When the first pixel data configuration (1205) in the two-dimensional image (105) does not change, there is not movement of the dynamic micro-lens array (1110) and the first pixel data configuration (1205) within one or more optical waveguides (405) does not change, which is indicated by the unchanging optical waveguides (405) within the dashed enclosure representing the first pixel data configuration (1205).

With a first change in two-dimensional image (105) pixel data, the dynamic micro-lens array (1110) correspondingly vibrates, which causes the pixel data to be divided as shown in a second pixel data configuration (1210), which is indicated by the change within the optical waveguide within the dashed enclosure representing the second pixel data configuration (1210). This makes the screen (102) have two times more horizontal resolution than would be present without the dynamic micro-lens array (1110).

Making the dynamic micro-lens array (1110) vibrate or move in synchrony with a second change in two-dimensional image (105) pixel data causes the pixel data to be divided as shown in a third pixel data configuration (1215), which is indicated by the change within the optical waveguide within the dashed enclosure representing the third pixel data configuration (1215). This makes the screen (102) have three times more horizontal resolution then without using the dynamic micro-lens array (1110).

The movement of the dynamic micro-lens array (1110) is preferably created by a small piezoelectric actuator, rotating an acentric disk or voice coil actuator, for example. Movement of the dynamic micro-lens array (1110) should be precise, synchronized with the alternating image, stable over time, guided to prevent de-orientation, and at a precise and constant distance towards the static micro-lens array (410).

Using a static micro-lens array (410) coupled with a dynamic micro-lens array (1110), TYPE-B ribbons and alternating image data is, therefore, a very cost effective way to increase the horizontal resolution of the screen by a factor.

Making or building the device is anticipated to require the use of robotics to automatically process the ribbons and stack them together. Preferably, rigid low vacuum pickup heads would pick up and position the ends of the ribbons to prevent deformation. Video cameras may be used as measuring instruments with image recognition software to identify each ribbon (115) when positioning the ribbon into the stack (130). Depending on the method used to create the ribbons, ribbons may be placed onto the spacer material (125) as part of the process of creating the ribbon. Ribbons may be produced one at a time or multiple ribbons in parallel and optionally fixed to the spacer material (125) in the process of making them.

Each ribbon (115) may be fabricated with a difference between the width and or thickness of its receiving end (305) and its output end (310). Since projecting an image into the receiving end (305) will in most cases be accomplished with an optical projection system, it may be desirable for purposes of improving the projection quality to have a smaller receiving end then normally obtained in constructing the device. As discussed, one method of reducing the receiving end size is to form a taper.

Example 3

The image transforming device (100) in an auto-stereoscopic display can create an auto-stereoscopic image with (N×S/H) pixels horizontally and (M/S) pixels vertically, where H is the number of viewing zones, N is the number of pixels in the horizontal direction of the two-dimensional image (105), M is the number of pixels in the vertical direction of the two-dimensional image (105), and S is the first quantity of ribbons placed adjacent to each other on the spacer material (125) at the output end (310). The table below illustrates how the image transforming device (100) receives 0.05 mm square pixels can create different auto-stereoscopic displays using a received image of 1920×1080 pixels:

| S | H = viewing zones | # lenses = Horz. Res. | Vertical Resolution | Screen size |
|---|---|---|---|---|
| 2 | 32 | 120 | 540 | 19.2 × 86.4 cm |
| 3 | 32 | 180 | 360 | 28.8 × 57.6 cm |
| 4 | 24 | 320 | 270 | 38.4 × 32.4 cm |
| 4 | 32 | 240 | 270 | 38.4 × 32.4 cm |

Because there are no electrical connections on or in the image transforming device (100) and all ribbons and spacers at the output end form one solid state screen, it is possible assemble multiple image transforming devices to create one large auto-stereoscopic display.

Example 4

An image transforming device (100) may be constructed as one large auto-stereoscopic display, 2.1 meters high and 3.73 meters wide having 1920 lenticular lenses each having 1080 vertical pixels each being 1.94 mm large, creating 48 viewing zones. This requires the use of 48 image projectors having a micro display with 1920×1080 image elements. The large auto-stereoscopic display is divided into 3 devices vertically and 16 devices horizontally, 48 in total. The screen of each device is 70 cm high and 23.3 cm wide. Each device has a screen with 120×360 3D pixels. Each screen of each image transforming device (100) is then made up out of 360 layers each emitting 120×48=5760 pixels. The average length of the ribbons in one device is 45 cm long. The maximum size of each projected image pixel is 0.04 mm. The spacer material is 23 cm long, 2 cm wide, 1.9 mm thick and made out of the same acrylic material as a lenticular screen.

The lenticular screen is 70 cm high and 23.3 cm wide. It is connected to the screen so that joining the 48 units can be accomplished with a near minimum of distance between them. The small projectors are electronically connected to a computer graphics card. The 48 graphics cards are placed into one PCI express expansion unit (Peripheral Component Interconnect Express). The PCI express unit is connected via an extension cable and interface card to a host computer. The software in the host computer using OpenGL or DirectX programming transfers the appropriate data to be displayed to each and all computer graphics card. This configuration is intended for a billboard-size 3D display for publicity.

Example 5

An image transforming device (100) may be constructed using TYPE B ribbons and the static micro-lens array (410) coupled with the dynamic micro-lens array (1110). This combination creates a high resolution auto-stereoscopic display that gives a similar result as would a horizontal parallax-only holographic display in full color. Using one image transforming device (100) and a projector with 1920×1080 pixel image and a 180 Hz refresh rate, such as a professional 3 chip LCOS (Liquid Crystal on Silicon) projector. Each row of pixels in the screen is made up out of 3 ribbons and creates a screen with 5760×360 pixels without using the static micro-lens array (410) and the dynamic micro-lens array (1110). Using the moving dynamic micro-lens array (1110) to create 60 Hz 3D images multiplies the viewing zones by a factor 180/60=3, resulting in 3×32=96 views. The screen then has 1.28 mm pixels and a size of 23 cm wide and 46 cm high. This configuration is useful for 3D display as a point of sale showing a 3D product with a compelling animation in 3D.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the movie and image-display industries.

What is claimed is:

1. An image transforming device for auto-stereoscopic display of a two-dimensional image that is projected, the two-dimensional image comprising: pixels arranged in a grid, the grid comprising rows of pixels having a uniform height and columns of pixels having a uniform width; the image transforming device comprising:
   a plurality of optical waveguides assembled into ribbons, each ribbon having a height at least equal to the height of a row of pixels in the grid, the number of optical waveguides in each ribbon comprising at least two times the number of pixels in the row of pixels;
   each ribbon comprising:
      a receiving end for receiving a portion of the pixels, the portion of the pixels comprising at least one of the rows of pixels in the grid;
      an output end emitting the portion received at the receiving end;
      the ribbons organized into a stack at their receiving end, the stack comprising a quantity of ribbons at least equal to the number of pixels in one of the columns of pixels;
      the ribbons connected at the output end to form a screen, wherein a first quantity of ribbons is fixed into position adjacent to each other to form a first output row of pixels and the remaining ribbons forming additional output rows of pixels fixed similarly as the first output row of pixels and aligned above the first quantity of ribbons; and
   a spacer material between each output row of pixels separating each ribbon from another ribbon in the screen.

2. An image transforming device according to claim 1, wherein the optical waveguides within any one ribbon have a random vertical alignment and are positioned within said ribbon so that each optical waveguide's horizontal position is at the same relative position measured from an edge of the ribbon at both the receiving end and the output end of said ribbon.

3. An image transforming device according to claim 1, wherein the optical waveguides within any one ribbon are aligned vertically and horizontally with each other and are positioned within said ribbon so that each optical waveguide's horizontal position is at the same relative position measured from an edge of the ribbon at both the receiving end and the output end of said ribbon.

4. An image transforming device according to claim 1 further comprising a lenticular placed adjacent to the screen, wherein the spacer material and the output end of each ribbon have a shape conforming to the lenticular such that there is an equal distance between the lenticular and all portions of the screen; and wherein the lenticular and the screen have a geometric form selected from the group consisting of planar, cylindrical concave and cylindrical convex.

5. A combination screen for viewing an image, the combination screen comprising an assembly of screens formed by a plurality of the image transforming devices according to claim 1.

6. An image transforming device for auto-stereoscopic display of a two-dimensional image projected in changing colors, the two-dimensional image comprising: pixels arranged in a grid, the grid comprising rows of pixels having a uniform height and columns of pixels having a uniform width; the image transforming device comprising:
- a plurality of optical waveguides assembled into ribbons, each ribbon having a height at least equal to the uniform height of a row of pixels in the grid, the number of optical waveguides in each ribbon comprising at least two times the number of pixels in the row of pixels;
- each ribbon comprising:
  - a receiving end for receiving a portion of the pixels, the portion of the pixels comprising at least one of the rows of pixels in the grid;
  - an output end emitting the portion of the pixels received at the receiving end;
  - the ribbons organized into a stack at their receiving end, the stack comprising a quantity of ribbons at least equal to the number of pixels in one of the columns of pixels;
  - the ribbons connected at the output end to form a screen, wherein a first quantity of ribbons is fixed into position adjacent to each other to form a first output row of pixels and the remaining ribbons forming additional output rows fixed similarly as the first output row of pixels and aligned above the first quantity of ribbons;
- a static micro-lens array located between the stack and the two-dimensional image to reduce the size of each pixel received at the receiving end of each ribbon, wherein each of the pixels is formed into a reduced pixel;
- a dynamic micro-lens array, the dynamic micro-lens array capable of motion synchronized with the changing colors of the two-dimensional image, the dynamic micro-lens array positioned between the stack and the static micro-lens array, said motion causing displacement of each reduced pixel to different position on the receiving end than would otherwise be the case in the absence of such displacement; and
- a spacer material between each output row of pixels separating each ribbon from another ribbon in the screen.

7. An image transforming device for auto-stereoscopic display of a two-dimensional image that is projected, the two-dimensional image comprising: pixels arranged in a grid, the grid comprising rows of pixels having a uniform height and columns of pixels having a uniform width; the image transforming device comprising:
- a plurality of optical waveguides assembled into ribbons, each ribbon having a height at least equal to the height of a row of pixels in the grid, the number of optical waveguides in each ribbon comprising the number of pixels in the row of pixels;
- each ribbon comprising:
  - a receiving end for receiving a portion of the pixels, the portion of the pixels comprising at least one of the rows of pixels in the grid;
  - an output end emitting the portion received at the receiving end;
  - the ribbons organized into a stack at their receiving end, the stack comprising a quantity of ribbons at least equal to the number of pixels in one of the columns of pixels;
  - the ribbons connected at the output end to form a screen, wherein a first quantity of ribbons is fixed into position adjacent to each other to form a first output row of pixels and the remaining ribbons forming additional output rows of pixels fixed similarly as the first output row of pixels and aligned above the first quantity of ribbons; and
- a spacer material between each output row of pixels separating each ribbon from another ribbon in the screen.

* * * * *